(12) United States Patent
Wintzell et al.

(10) Patent No.: US 9,508,388 B2
(45) Date of Patent: Nov. 29, 2016

(54) METHOD AND APPARATUS FOR PROCESSING MOTION VIDEO

(71) Applicant: Axis AB, Lund (SE)

(72) Inventors: Petter Wintzell, Lund (SE); Oskar Gustafsson, Malmö (SE); Zacharias Enochsson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/482,791

(22) Filed: Sep. 10, 2014

(65) Prior Publication Data

US 2015/0071606 A1 Mar. 12, 2015

(30) Foreign Application Priority Data

Sep. 11, 2013 (EP) .................................... 13183930

(51) Int. Cl.

| | |
|---|---|
| *H04N 9/80* | (2006.01) |
| *G11B 27/30* | (2006.01) |
| *G11B 27/10* | (2006.01) |
| *H04N 5/93* | (2006.01) |
| *G09G 5/00* | (2006.01) |

(Continued)

(52) U.S. Cl.
CPC ............... *G11B 27/30* (2013.01); *G09G 5/005* (2013.01); *G11B 27/105* (2013.01); *H04N 5/77* (2013.01); *H04N 5/93* (2013.01); *H04N 7/18* (2013.01); *H04N 9/8205* (2013.01); *G09G 2360/02* (2013.01); *G09G 2370/022* (2013.01); *G09G 2370/027* (2013.01); *H04N 21/4621* (2013.01)

(58) Field of Classification Search
CPC .................................. H04N 9/80; H04N 5/76
USPC ................ 386/251, 240, 239, 248, 291, 297
See application file for complete search history.

(56) References Cited

U.S. PATENT DOCUMENTS

| | | | |
|---|---|---|---|
| 7,689,102 B2* | 3/2010 | Kawai et al. ................. | 386/291 |
| 2007/0124782 A1 | 5/2007 | Hirai et al. | |

(Continued)

FOREIGN PATENT DOCUMENTS

| | | |
|---|---|---|
| CN | 101527822 A | 9/2009 |
| CN | 101783945 A | 7/2010 |

(Continued)

OTHER PUBLICATIONS

CN 201410461173.3 Office Action (Oct. 30, 2015).

(Continued)

*Primary Examiner* — Daquan Zhao
(74) *Attorney, Agent, or Firm* — Volpe and Koenig, P.C.

(57) ABSTRACT

The present invention relates to a method for preparing presentation of recorded motion video. The method preparing and sending a request for recorded video that originates from a specific video source, receiving a video information message including data relating to characteristics of a plurality of motion video recordings captured by the video source, wherein the received characteristics of each motion video recording includes a recording identity, a video quality value, a media address, an indication of start time and end time for the recording, and generating a motion video play scheme based at least on said video quality value, said indication of start time, and said indication of end time for each motion video recording.

10 Claims, 9 Drawing Sheets

(51) Int. Cl.
  H04N 7/18     (2006.01)
  H04N 5/77     (2006.01)
  H04N 9/82     (2006.01)
  H04N 5/76         (2006.01)
  H04N 21/462       (2011.01)

(56) References Cited

U.S. PATENT DOCUMENTS

| | | |
|---|---|---|
| 2011/0119716 A1 | 5/2011 | Coleman, Sr. |
| 2012/0113265 A1 | 5/2012 | Galvin |
| 2012/0174161 A1 | 7/2012 | Mathews et al. |
| 2014/0137168 A1* | 5/2014 | Takahashi et al. ............. 725/90 |

FOREIGN PATENT DOCUMENTS

| | | |
|---|---|---|
| CN | 101998111 A | 3/2011 |
| CN | 102143345 A | 8/2011 |
| JP | 2005-17791 A2 | 8/2005 |
| TW | 200913712 A | 3/2009 |
| WO | 2005074274 A1 | 8/2005 |

OTHER PUBLICATIONS

EP 13 18 3930 European Search Report (Jan. 28, 2014).
EP 13 183 930.0 European Office Action (Jul. 28, 2014).

* cited by examiner

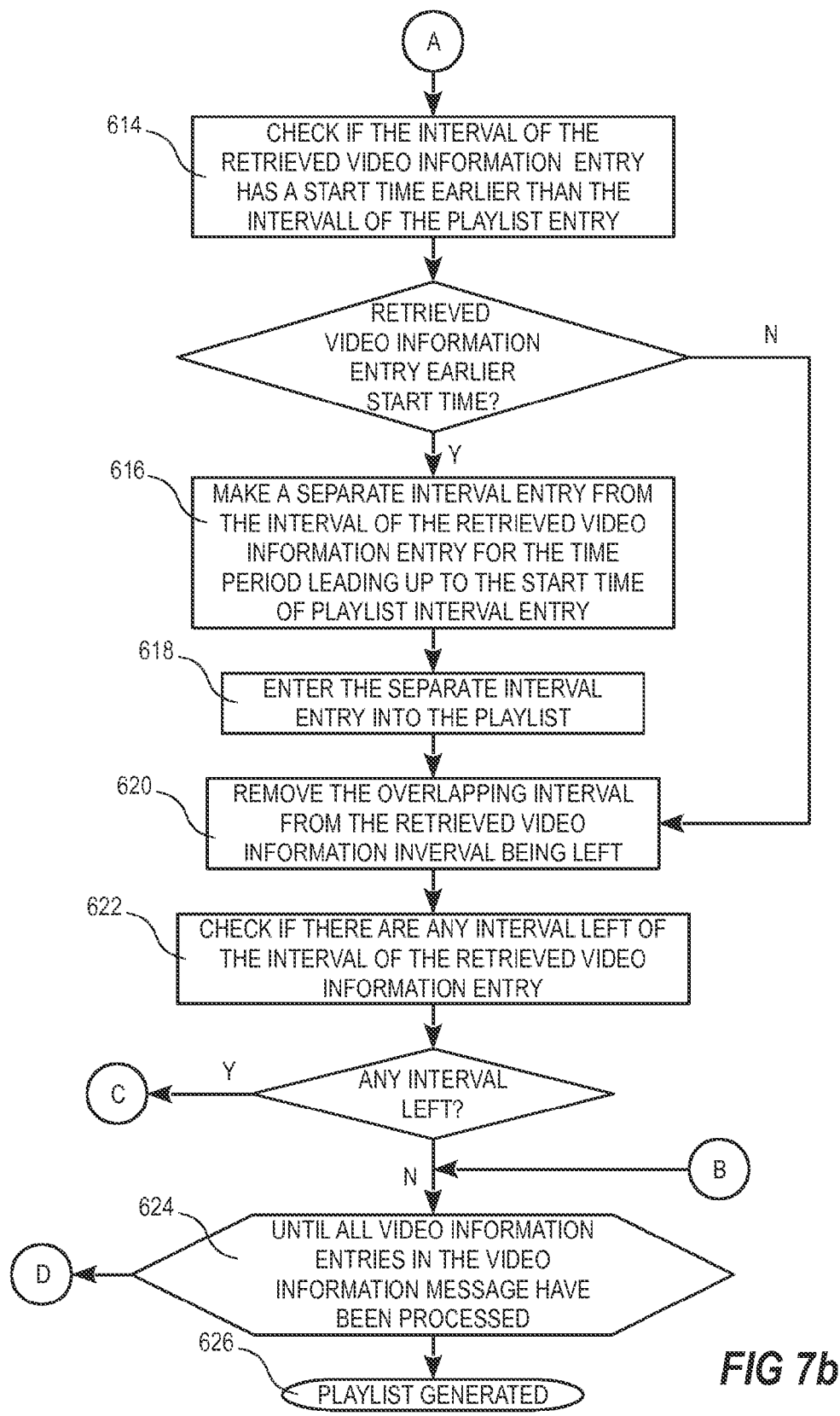

METHOD AND APPARATUS FOR PROCESSING MOTION VIDEO

FIELD OF INVENTION

The present invention relates to video technology and specifically to methods for preparing presentation of recorded motion video and methods for presenting recorded motion video.

BACKGROUND

Recordings of motion video of a scene at different qualities, which often are initiated by external triggers, by events in the scene, by environmental changes, scheduled recordings, etc., has become more and more common in surveillance and monitoring systems including motion video cameras. One reason for the differentiated video quality is to save storage space, which may be a rare commodity in the systems, at least in view of motion video recordings which are known to require a lot of storage space. In systems having a plurality of users the differentiated video quality may be a result of different requirements and different main interests between different users or different display equipment.

For example, a video camera monitoring a shop may be arranged to constantly record a low resolution motion video, to record a higher resolution motion video when movement is detected in specified parts of the scene, and to record an even higher resolution motion video when an alarm is triggered by an external sensor. Hence, a plurality of motion video recordings of the same scene during overlapping time periods is stored.

An operator of such a surveillance or monitoring system is occasionally interested in playing back recorded motion video starting at a specific point in time. The operator then has to select the video recording that is most likely to include video from a time period including this point in time. If the operator want to study, for example, a period starting some time before an motion detection or an alarm, the operator would have to display the low resolution motion video and if then when the playback reaches a point in time when a higher resolution motion video exists the operator has to manually switch to the higher resolution motion video or keep watching the low resolution motion video stream.

In UK patent application GB 2 427 521 there is provided an image display method including an image reproduction function capable of effectively reproducing image data recoded in various forms in a storage device. The application describes a system where consecutive pictures from one camera are stored on an image storage and delivery server. Two channels are implemented in the image storage and delivery server, each for images from the same camera but stored at different rates, e.g. a normal channel (low frame rate) and an alarm channel (high frame rate). A method described in the application describes reproducing images on a monitor of a client device according to a method called "conducting seamless reproduction" taking into account images from each of the channels. This method operates by reproducing images from the alarm channel during the time periods when there are images in the alarm channel and then for the time period when there are no longer any images in the alarm channel but when there are images in the normal channel, the method reproduces the images from the normal channel. For time periods when there are no images in any of the channels it is possible to skip reproducing until image data is present in any of the channels again. The reason why reproduction of the image data in the alarm channel is provided with priority is that it is possible to ascertain contents in more detail by reproducing the image data in the alarm channel having the image data recorded at high frame rate. The described system have the client device check time stamps of images in the image storage and delivery server and then request images with a calculated frame number, which may be from both the normal channel and the alarm channel, then the client selects the image to be reproduced.

One of the problems with a method and system as described above is that it is quite complex, memory demanding and processing intensive.

SUMMARY

One object of the present invention is to provide a method for preparing presentation of recorded motion videos.

At least one of the objects is achieved by means of a method for preparing presentation of recorded motion video according to claim 1 and by means of a method for preparing presentation of recorded motion video according to claim 12. Further embodiments of the invention are presented in the dependent claims.

More specific, according to one embodiment of the invention, a method for preparing presentation of recorded motion video comprises preparing and sending a request for recorded video that originates from a specific video source, receiving a video information message including data relating to characteristics of a plurality of motion video recordings captured by the video source, wherein the received characteristics of each motion video recording includes a recording identity, a video quality value, a media address, an indication of start time and end time for the recording, and generating a motion video play scheme based at least on said video quality value, said indication of start time, and said indication of end time for each motion video recording. One advantage of this embodiment is that the network load due to transmission of motion video recordings may be kept low. One reason for this is that the playlist refers to motion video recordings possibly stored at different locations which make it possible to generate the playlist without downloading all the motion video recordings. Another, reason is that the method enables playback of a scene including overlapping motion video recordings without downloading all the overlapping motion video data or motion video recordings.

In another embodiment said video quality value includes a video resolution value and wherein the act of generating a motion video play scheme additionally is based on an intended video resolution for the presentation at an intended presentation device.

In yet another embodiment said video quality value includes a video resolution value and wherein the generation of a motion video play scheme includes selecting one motion video recording to represent a specific time period for which time period a plurality of motion video recordings have been identified, the selecting includes selecting the motion video recording in the specific time period having a video resolution value that is lower than the motion video recording having the highest video resolution value. One advantage of not selecting a motion video based on that it has the highest video quality value is that the motion video received at the client may require less bandwidth to be transmitted in case of the system not requiring higher video quality. Another advantage is that the motion video received at the client will require less processing power to be adapted for presentation. This type of situations may, for example, occur when the some of the motion video recordings stored have higher resolution than the presentation format at the client currently require, if the display is a low resolution display, if a plurality of motion videos are to be presented simultaneous, etc.

According to another embodiment the generation of a motion video play scheme includes selecting one motion video recording to represent a specific time period for which time period a plurality of motion video recordings have been identified, the selecting includes selecting the motion video recording requiring least adjustment for being presented. One advantage of this feature is also that the motion video received requires less processing power to be adapted for presentation.

According to yet another embodiment said video quality value includes a video resolution value and wherein the generation of a motion video play scheme includes selecting one motion video recording to represent a specific time period for which time period a plurality of motion video recordings have been identified, the selecting includes calculating a video selection value for each motion video recording representing the time period and then select the motion video recording having a video selection value closest to a predetermined target video selection value, the video selection value for each motion video recording in the specific time period is calculated from a relation between an intended video resolution and the video resolution of the motion video recording. Similar to the above described embodiment one advantage of this particular embodiment is that the motion video received at the client may have required less bandwidth to be transmitted, as a result of the particular selection process. Another advantage may be that the motion video received at the client requires less processing power from the client in order to be adapted for presentation.

In one embodiment said video quality value further includes a video aspect ratio and wherein the video selection value for each motion video recording is further calculated from an intended video aspect ratio and the video aspect ratio of the motion video recording. Once more, it is an advantage to select a motion video recording where the qualities of the recording are closest to the video quality that the client is able to present. Another advantage of considering the aspect ratio is that it is possible to match the aspect ratio of an allowed presentation area in order to minimize area not utilized for presenting the requested motion video.

In another embodiment said request for video from a specific video source is sent to a video managing server.

In yet another embodiment said request for video from a specific video source is sent via a computer network and wherein said video information message is received via a computer network.

According to another embodiment said video quality value includes a video frame rate value and wherein the generation of a motion video play scheme includes selecting one motion video recording to represent a specific time period for which time period a plurality of motion video recordings have been identified, the selecting includes selecting the motion video recording in the specific time period having a video frame rate value that is lower than the motion video recording having the highest video frame rate value. One advantage of this feature is that no more data than necessary has to be transmitted over the network.

In one embodiment the generated motion video playback scheme includes a plurality of recording identities, media addresses related to the recording identities and start times related to the recording identities, wherein the start times indicates a temporal position in the related motion video recording.

According to another aspect of the invention a method for presenting recorded motion video includes one of the above methods preparing a presentation of recorded motion video. This method further comprises the steps of retrieving for each start time in the generated motion video play scheme the related recording identity and the related media address, requesting from the retrieved media addresses motion video recordings having the retrieved recording identities related to each media address, and presenting the retrieved motion video recordings in the order defined by the motion video play scheme. The advantages of this aspect of the invention are at least the same as for the method for preparing a presentation as discussed above.

According to a further aspect of the invention a method for preparing presentation of recorded motion video comprises receiving a request from a client for video that originates from a video source, assembling a video information message from stored data relating to characteristics of a plurality of motion video recordings recorded by the video source, sending the video information message to the client, and receiving at least one request for part of a video recording identified in said video information message. By sending a video information message it is possible to avoid sending an extensive amount of video data that never will be used, hence the network avoid a great network load originating from the transmission of video data.

In one embodiment the request for video that originates from a video source is received at a video managing server and wherein the assembling of the video information message is performed by the video managing server.

In another embodiment the data relating to characteristics of a plurality of motion video recordings is assembled from a data base being managed by the video managing server.

In yet another embodiment of the invention the characteristics of the motion video recordings included in the video information message includes recording identity, video resolution value, media address, indication of start time for a motion video recording, and indication of end time for a motion video recording.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which FIGS. 7a and 7b is a flowchart showing a process for generating a playlist according to one embodiment of the invention.

Further, in the figures like reference characters designate like or corresponding parts throughout the several figures.

DETAILED DESCRIPTION OF THE PREFERRED EMBODIMENTS

Figure 1:
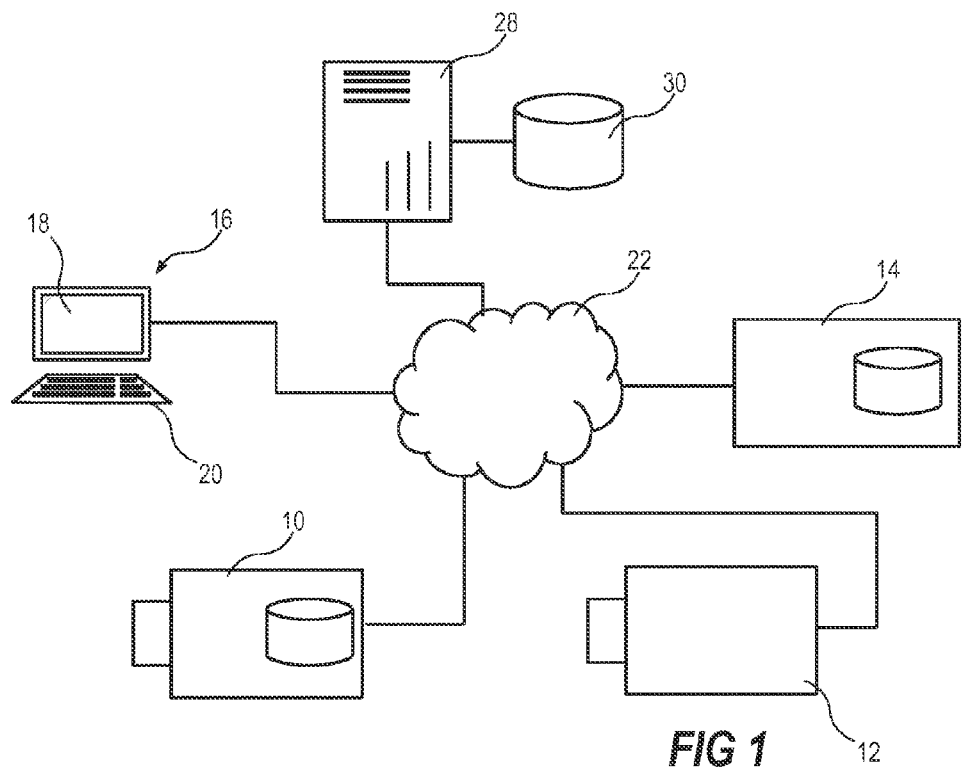
FIG. 1 is a block diagram of a system in which one embodiment of the invention may be implemented.

FIG. 1 shows one system in which an embodiment of the invention may be implemented. This system includes motion video cameras 10, 12, a Network Attached Storage (NAS) 14 or some kind of file server, a client 16 having a display 18 and input means 20, and a video managing server 28 being connected to optional storage device 30 for storing motion video recordings. The client 16, the NAS 14, and the cameras 10, 12 are connected to a network 22 for communication. The optional storage device 30 may be directly connected to the video managing server The network 22 may be any type of network that allows electronic devices to exchange data. The network may be wired, wireless or any combination thereof. It may be implemented by means of any known network protocol allowing the exchange of data between the electronic devices of the system, e.g. Ethernet (IEEE 802), Internet Protocol (IP) combined with TCP, UDP, or FTP, Synchronous optical networking (SONET), Synchronous Digital Hierarchy (SDH), Asynchronous Transfer Mode (ATM), etc. The system may be implemented using any size network, e.g. a Local Area Network (LAN) or a Wide Area Network (WAN).

The motion video cameras 10, 12, may be any camera that is capable of capturing motion video, i.e. capture sequential images at a rate of one frame per second or faster, and that is configured to communicate over a network 22. For instance may a camera of the system be an AXIS M10 Series camera, an AXIS M11 Series camera, an AXIS P13 Series camera, an AXIS Q16 Series camera, an AXIS Q17 Series camera, an AXIS M30 Series camera, an AXIS M31 Series camera, an AXIS M32 Series camera, an AXIS P33 Series camera, an AXIS M50 Series camera, an AXIS P55 Series camera, an AXIS Q60 Series camera, an AXIS Q87 Series camera, an AXIS P12 Series camera, etc. The system may include motion video cameras 10 that includes more storage space than necessary for normal processing and which may be used for more than temporary storage of motion video recordings, e.g. motion video cameras provided with hard drives, flash drives, or exchangeable memory cards. Exchangeable memory cards may for instance be Secure Digital memory cards, i.e. SD-cards.

The NAS 14 may be any storage device that motion video recordings may be stored on via the network and that the motion video recordings may be accessed from via the network.

The client 16 is arranged to be a device where motion video recordings recorded by the motion video cameras may be played back, i.e. the client 16 is able to present motion video to an operator of the client 16. The client 16 may be any computer having a display 18 for presenting captured motion video and input device 20 for controlling the presentation of the motion video. Hence, the client 16 may be a personal computer, a workstation, a touch screen computer, a mobile phone, a PDA (personal digital assistant), etc. Moreover, the client may be a presentation device in a dedicated surveillance centre.

The system may, as would be readily understood by a person skilled in the art, include any combination of motion video cameras 10, 12 and NAS devices 14. For example, the system may include only motion video cameras 10 having the extra storage for recorded video, or it may include only motion video cameras 12, which require external storage solutions for storage of motion video recordings, and a NAS 14. The cameras 10, 12 may also be combined including any number of cameras of each type in the system. Moreover, the system may include more than one NAS.

The video managing server 28 may be a device having a lot of functionality relating to handling, distributing, and controlling motion video, motion video recordings and cameras capturing said motion video. However in this description we will only describe the functions of the video managing server 28 that is relevant for the present invention. Further, the video managing server 28 includes a database over the cameras 10, 12 and the NAS devices 14 that are to be managed and accessed by it. The database includes identifiers and addresses of the cameras 10, 12 and the NAS devices 14.

Figure 2:
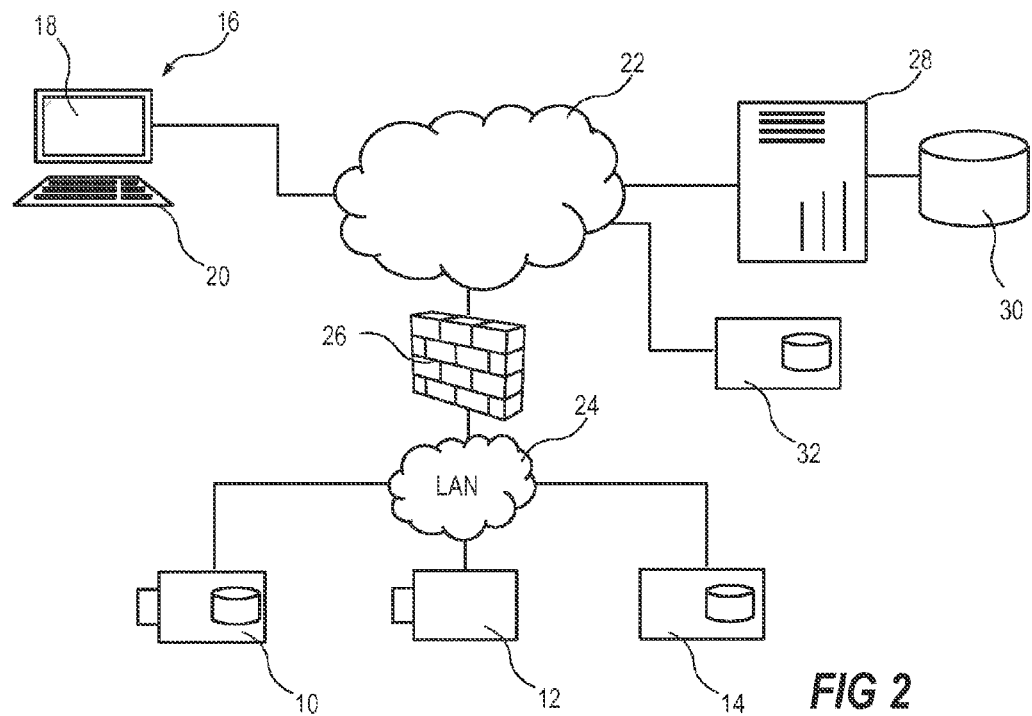
FIG. 2 is a block diagram of another system in which one embodiment of the invention may be implemented, FIG. 3 schematically shows the relation between video recordings at different video qualities and time.

In FIG. 2 another system in which an embodiment of the invention may be implemented is showed. This system is basically a system as the one described in connection with FIG. 1 and it still includes motion video cameras 10, 12, a NAS, a client 16, a video managing server 28, video managing server storage device 30, and a network 22. However, in this system the motion video cameras 10, 12 and the NAS 14 are connected to a network 24, in this embodiment a LAN, behind a firewall 26, from the perspective of the client 16. The system may also include a NAS 32 on the video managing server 28 side of the firewall 26 instead of having a storage device 30 operating through the video managing server 28.

The firewall 26 is a type of device that is well known to the person skilled in the art and may generally be described as a network security system that controls the incoming and outgoing network communications determining whether the communication should be allowed through or not. In many systems the firewall is set up not to let communication through into an internal network and is thereby operating as a barrier between a trusted, secure internal network and another network (e.g., the Internet) that is not assumed to be secure and trusted. Hence, the firewall 26 is blocking the client 16 from sending messages to the cameras 10, 12 or the NAS 14. One function of the video managing server 28 is to enable a communication channel from the client 16 to the cameras 10, 12 or the NAS 14. One example of such a function is described in the published international patent application WO 2006/073348 A1 in the name of AXIS AB. The skilled person is well aware of additional and alternative ways to implement this function.

Figure 3:
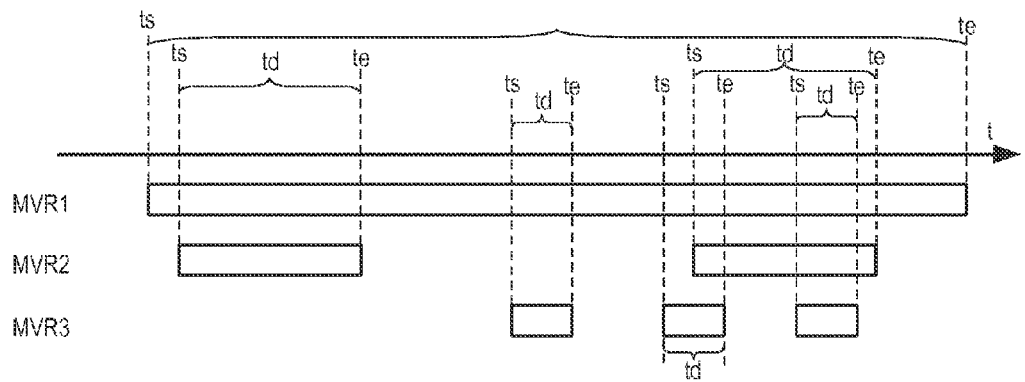

Now referring to FIG. 3, motion video recordings MVR1, MVR2, MVR3, captured by a camera 10, 12 are stored in a motion video camera 10, in a NAS 14 in the network behind the fire wall 26, in a NAS 32 in the same network as the client 16, or in a storage device 30 directly connected to the video managing server 28. The motion video recordings MVR1, MVR2, MVR3 are not necessarily stored in the same storage device 10, 14, 30, even if they are captured by the same motion video camera. In one embodiment a long recording, e.g. MVR1, may be stored in the storage device 30 of the video manager server 28 and a shorter recording, e.g. MVR2 or MVR3, may be stored in a NAS 14 or in a motion video camera 10.

Moreover, the different video recordings may have different characteristics. For example, the video recording MVR1 may be a recording of the entire day from a specific motion video camera. In order to save storage space this recording may be of a relatively low resolution, low frame rate, or both low resolution and low frame rate. Further, the video recordings MVR2 may be a scheduled recording having higher video quality than MVR1, e.g. higher resolution, higher frame rate, or both. The time periods scheduled for these recordings may for example be selected based on past experience of that interesting events occurs at these time periods. In this example the video recordings MV3 may be an alarm triggered video recording. Such recording may be set to be performed at full resolution, full frame rate, or both full resolution and full frame rate and for a predetermined duration or until the triggering event has ended.

Each motion video recording is related to a start time ts and an end time te, alternatively a start time ts and a duration time td. Anyway, if you know the start time ts and the duration time td you may calculate the end time te or if you know the start time ts and the end time te the duration time is easily calculated. In the following description the invention will be described using the start time ts and the end time te, but the use of duration time td instead of end time te is obvious for the skilled person.

Figure 4:
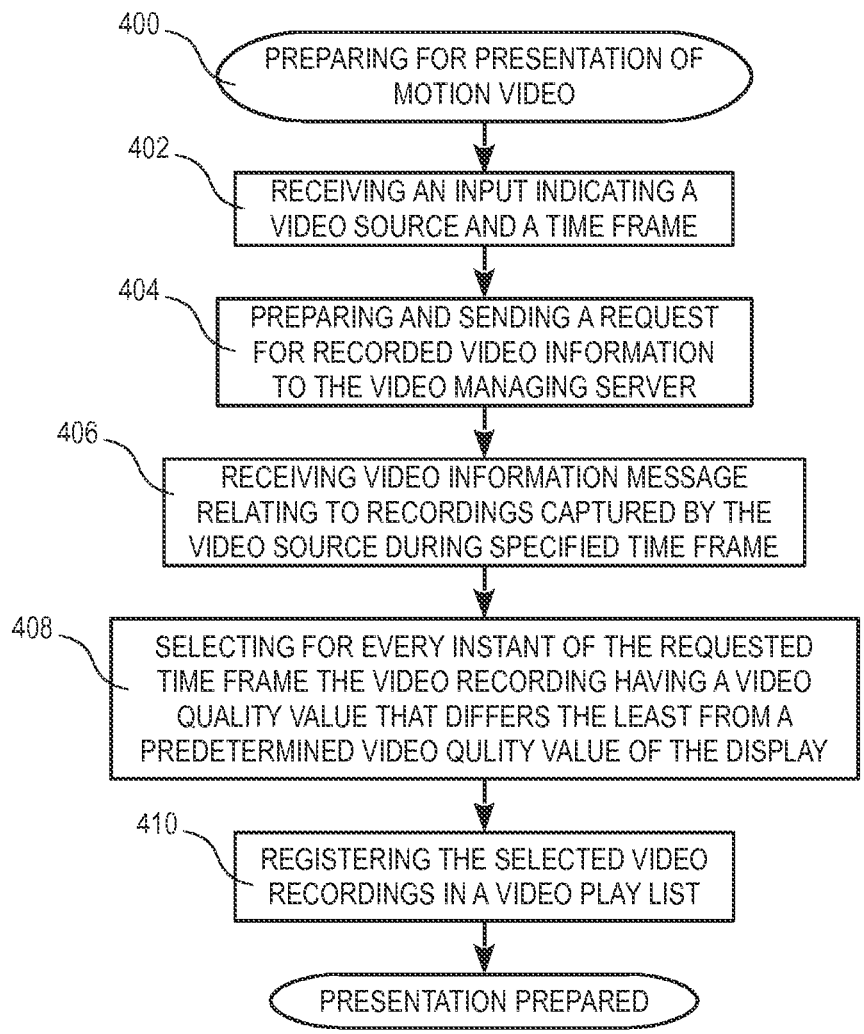
FIG. 4 shows a flowchart of a process at a client for preparing presentation of motion video, FIG. 5 schematically shows a playlist generated based on a playlist generating scheme according to one embodiment of the invention and the motion video recordings considered for the playlist, FIG. 6 schematically shows a playlist generated based on a playlist generating scheme according to another embodiment of the invention and the motion video recordings considered for the playlist.

Now referring to the flowchart of FIG. 4, in which the process of preparing a presentation of recorded motion video is showed. Initially an operator selects at the client 16 a video source and a time frame, or alternatively a start time, step 402. If a start time is selected the duration of the video requested may be set to a preset duration. Then the client prepares a request message and sends it to the video managing server 30, step 404. The request message may include a source identity that uniquely identifies the source from which the recorded video is requested. Further, the request message may include an indication of the time frame of the requested video, e.g. the start time and end time for the interval that is requested to be played back.

The term video source should, in the present application, be understood as the device, e.g. the camera, that captured the motion video. Motion video recordings from a single video source may then be stored at different locations on the network, e.g. in the camera, in a NAS, in the video managing server. Hence, when the operator selects a video source the operator may select a camera and in the subsequent request for motion video from this video source the camera will be identified and motion video recordings originating from this video source will be requested.

When the video managing server 30 has processed the request it returns to the client with a video information message. The video information message is received by the client and it includes information relating to recordings captured by the video source during the specified time frame, step 406. The video information message may include a recording identifier identifying each specific recording represented in the video information message, a start time and an end time for each recording, at least one video quality value for each recording, and a media address that makes it possible for the client to access each recording. The video information message does not include all the video data stored in each video recording. The video quality value may for example be based on video resolution, aspect ratio, frame rate, etc. The video information message may include any number of different types of video quality values for each recording. The media address may be in the form of a Uniform Resource Locator (URL).

Then the client processes the video information received by selecting, for a plurality of discrete points in time of the requested time frame, video data from the motion video recording that have a video quality value being closest to a predetermined target video quality value, step 408. This process of selecting the motion video recording may alternatively include generating a video selection value from one or a plurality of video quality values and then selecting the video recording having the video selection value closest to a predetermined target video selection value. Examples of how to calculate a video selection value will be presented below. Then the selected recordings or selected parts of recordings are registered in a play scheme, step 410. The play scheme is a plan including information relating to what to play and when to play it. According to one embodiment the play scheme is a playlist and the playlist may be formed as a list including, in chronological order, the media address to each recording that are to be played in response to the request from the operator. Each media address is also related to a start time and an end time, thereby making it possible to just play a portion of a recording and to just retrieve a portion of a recorded motion video instead of a great amount of data that is not relevant for the requested play back. The play scheme will be referred to as playlist henceforth.

Figure 5:
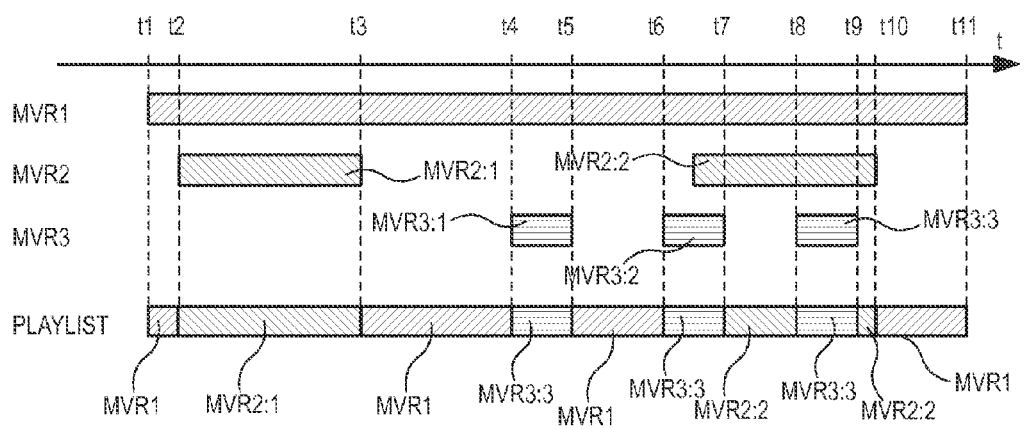

One example of the generation of a playlist and the resulting playlist is showed in FIG. 5. In this example the motion video recordings have the following video selection values, each which may be based on a single video quality value or on a combination of a plurality of video quality values from respective recordings:

Video Quality Value of Video Recordings
MVR1VS1=100
MVR2VS2=175
MVR3VS3=250

The predetermined target video selection value VSt of the client is 240. Considering the process described above relating to the selection step the motion video recording having the video selection value closest to the target video selection value is to be used. In order to find out which video selection value that is closest the absolute value of the difference between the video selection value of each motion video recording and the target video selection value may be calculated. This calculation result in the following differences:

$$|VS1-VSt|=140$$

$$|VS2-VSt|=65$$

$$|VS3-VSt|=10$$

The motion video recordings MVR3:1-3 have a video selection value that is closer to the target video selection value than any of the other motion video recordings and, thus, the motion video recordings are represented in the playlist for all intervals for which there are a motion video recording MVR3.

The motion video recordings MVR2:1-2 have a video selection value that is closer to the target video selection value than the video selection of motion video recording MVR1 and therefore motion video recordings MVR2 are selected for all intervals where they are available and where there are no motion video recordings MVR3 available.

The motion video recording MVR1 has a video selection value VS1 that is furthest apart from the target video selection value VSt in view of all the motion video recordings and is therefore listed in the playlist at the positions in time where no other video recording is available. In case there are time slots, intervals, where there are no motion video recordings available at all, i.e. none of the motion video recordings have any recordings for these time intervals, then these intervals may be skipped.

The playlist of FIG. 5 then may look something like this:

| media address to | start time | end time |
|---|---|---|
| MVR1 | t1 | t2 |
| MVR2:1 | t2 | t3 |
| MVR1 | t3 | t4 |
| MVR3:1 | t4 | t5 |
| MVR1 | t5 | t6 |
| MVR3:2 | t6 | t7 |
| MVR2:2 | t7 | t8 |
| MVR3:3 | t8 | t9 |
| MVR2:2 | t9 | t10 |
| MVR1 | t10 | t11 |

Figure 6:
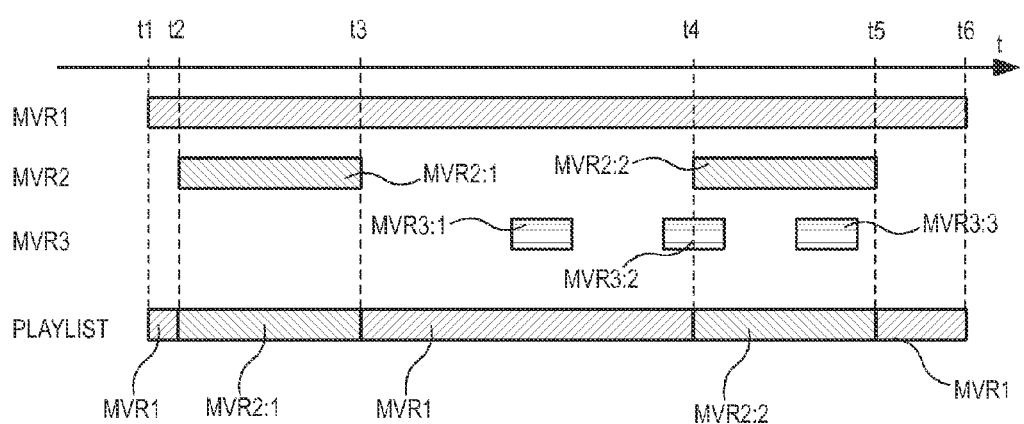

In FIG. 6 another example of the generation of a playlist is showed. In this example the predetermined video selection value VSt of the client is 150. The lower quality requirement may derived from the fact that the display of the client is not able to present high resolution images, that the motion video recording is to be presented as one of four simultaneously presented video recordings, that the bandwidth to the client is limited, etc. Let's assume that the video selection value is the same as in the example relating to FIG. 5. Then the difference between the video selection value of each motion video recording and the target video selection value is:

$$|VS1-VSt|=50$$

$$|VS2-VSt|=25$$

$$|VS3-VSt-=100$$

In view of the motion video recordings MVR1, MVR2, and MVR3 the motion video recordings MVR3:1-3 have video selection values that are furthest apart from the target video selection value VSt. Moreover, the motion video recording from MVR1 is present in all the time slots that the motion video recordings MVR3 are represented in and therefore the motion video recordings MVR3 will not be inserted in the playlist.

The motion video recordings MVR2:1-2 have a video quality value VS2 that is closest to the target video quality value VSt of the client, compared to the motion video recordings MVR1 and MVR3. Accordingly, the motion video recordings MVR2:1-2 are selected for the playlist at the intervals that they are present and the rest of the playlist refers to motion video portions from motion video recording MVR1. Hence, playlist entries in the playlist may be structured as intervals as showed in the table below:

| media address to | start time | end time |
|---|---|---|
| MVR1 | t1 | t2 |
| MVR2:1 | t2 | t3 |
| MVR1 | t3 | t4 |
| MVR2:2 | t4 | t5 |
| MVR1 | t5 | t6 |

As shown above in connection with the description of FIGS. 5 and 6 the video selection value for the motion video recordings may be calculated in various ways. The selection of video features to be used in generating or calculating the video selection value may depend on the application, the client, the user, or any other circumstance. Moreover, the video selection value may be based on a plurality of features and their individual video quality values which are given different weight in calculating the final video selection value.

In one embodiment the video selection value is calculated as $$VS_{score}=(1+(s-1)^2)(1+(p-1)^2)$$

Wherein $VS_{score}$ is the video selection value that is to be calculated, s is a scale factor value representing how much the selected motion video recording have to be uniformly scaled in order to fill a target frame, and $\rho$ is a "fraction filled" variable and it represents how much of the target frame that would be filled when the motion video has been scaled to fill the target frame along one of two axes of the target frame. In this equation the value of $VS_{score}$ that is closest to zero is the best value. This corresponds to using a target video selection value VSt of zero, i.e. VSt=0.

In another embodiment the video selection value $VS_{score}$ is calculated as a linear combination of weighted functions, e.g. video quality values, or a single function, as in the example above.

$$VS_{score} = c_0 f_0(x_0) + c_1 f_1(x_1) + c_2 f_2(x_2) + \ldots = \sum_{k=0}^{n} c_k f_k(x_k)$$

In this equation variable $c_k$ is a weight that may be set to enable prioritization of a function. An argument used in a function may be any one of a plurality of "quality" features, e.g. video resolution, aspect ratio, frame rate, etc. One advantage of this video selection value calculation is that the weighing of the features is fully controlled.

In yet another embodiment the video selection value $VS_{score}$ is calculated as a product of functions.

$$VS_{score} = f_0(x_0)f_1(x_1)f_2(x_2) \ldots = \prod_{k=0}^{n} f_k(x_k)$$

One characteristic of this type of equations is that all factors, i.e. the functions f(x), may have a great effect on the result. For example, if one of the functions is zero, then $VS_{score}$ becomes zero.

Figure 7A:
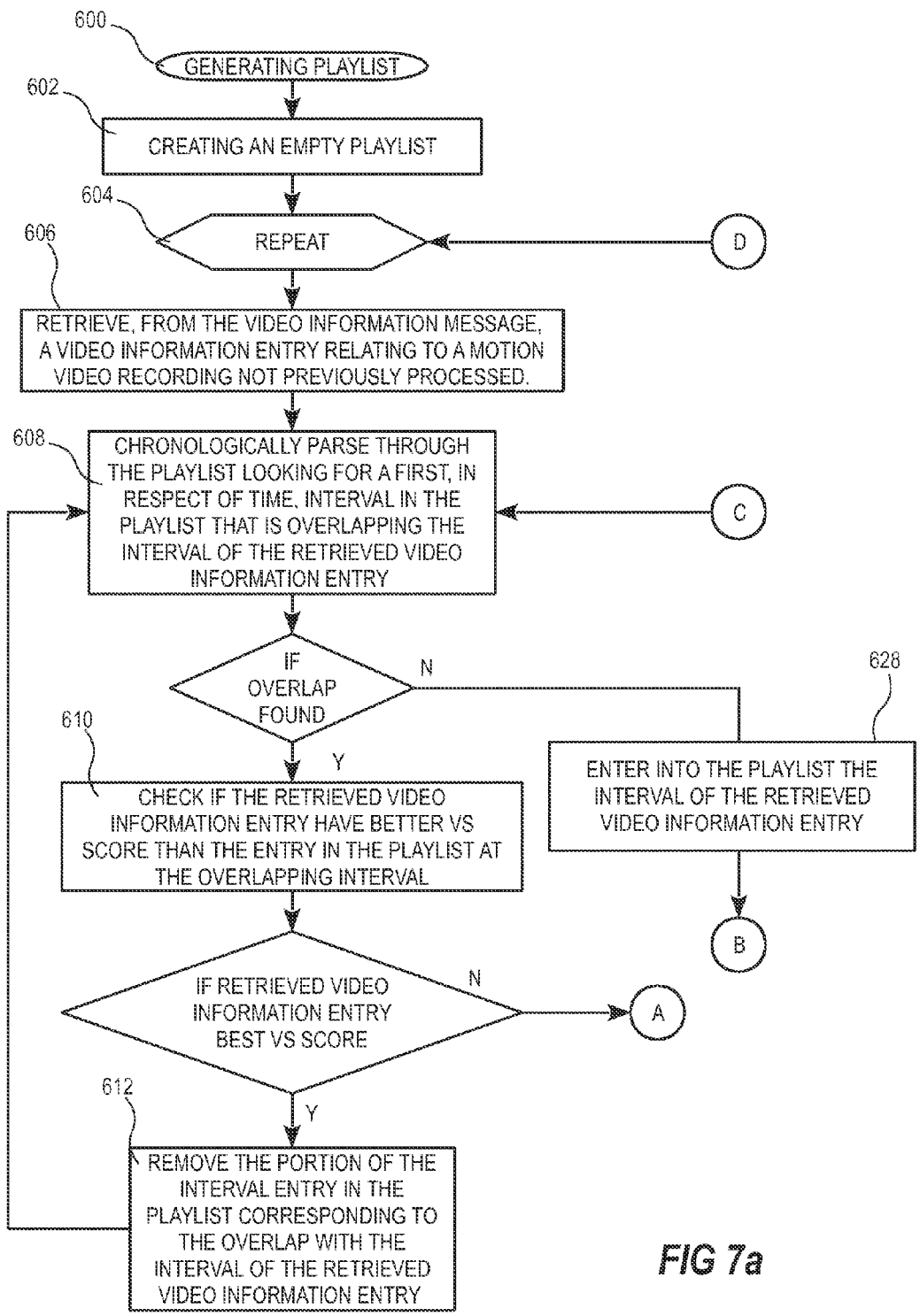

FIGS. 7a-b show a flowchart depicting one embodiment of a process for generating a playlist, 600, using any of the above video selection value calculating schemes. Initially an empty playlist is created, step 602, then the process reaches a portion of the process that is repeated, step 604, until all video information entries in the video information message received from the video managing server has been processed, step 624.

This iterative portion of the process begins with the act of retrieving a video information entry from the video information message, step 606. The selection of a video information entry to retrieve is based on if the entry already has been processed during the iteration period or not. This selection may be achieved in a plurality of ways. One way is by keep on deleting video information entries from the received video information message when they have been processed and then make the selection from the remaining entries. Another way is to simply set a flag on processed entries in order to mark them as processed and then skip them during the selection step.

The processing is then continued based on the selected and retrieved video information entry. The retrieved video information entry includes a start time and an end time defining a time interval represented by the retrieved video information entry. Then, the playlist, which initially is empty, is parsed chronologically, with respect to start time, in order to check if the interval of the retrieved video information entry overlaps any intervals already in the playlist, step 608. The first encountered overlapping entry found in the play list, when parsed through in chronological order, is the overlap processed in the next steps. If an overlap is found, then the video selection value, also referred to as video selection score, of the motion video recording represented by the retrieved video information entry is calculated and compared with video selection value of the overlapping interval already in the playlist, step 610. This comparison may be performed in one of the ways discussed earlier. If the retrieved video information entry has the best video selection value then the overlap in the playlist is removed, step 612, i.e. if the interval of the playlist is entirely overlapped the entire overlapped interval entry in the playlist is removed or if only a portion of the interval of the playlist is overlapped only the overlapped portion of the interval of the playlist is removed. Then the process returns to step 608 and check if the interval of the retrieved video information entry still overlap any intervals entered into the playlist.

If no overlap is found in step 608 then the retrieved video information entry is entered into the playlist, step 628. The interval of the retrieved video information entry may have been adjusted during the processing and therefore not represent the entire interval of the video information entry retrieved in step 606 from the video information message. When the retrieved video information entry has been entered into the playlist the process continues to process step 624.

Now, let us return to process step 610, where the video selection value of the retrieved video entry is compared with the video selection value of the overlapping entry in the playlist. If the video selection value of the retrieved video information entry is not better than the video selection value of the overlapping entry in the playlist then the process continues by checking if the interval of the retrieved video information entry has a start time that is earlier than the start time of the overlapping interval in the playlist, step 614. Then the interval of the retrieved video information entry is split at the time point corresponding to the start time of the overlapping interval in the playlist. The portion of the interval of the retrieved video information entry that is earlier than the start point of the overlapping playlist interval is formed to a separate interval entry, step 616. One way of doing this is to take the start time of the retrieved video information entry and the start time of the overlapping playlist interval and make these two time points the start time and the end time, respectively, for a new entry, the separate interval entry, wherein this separate interval entry is given all the other characteristics and features of the retrieved video information entry.

Further, the retrieved video information entry is then modified by changing the start time of its interval to the start time of the overlapping interval in the playlist. When the separate interval entry has been generated in step 616 the separate interval entry is entered into the playlist, step 618.

Then the process continues to step 620. This step is also the step the process proceeds to when the check in step 614, relating to if the start time in the retrieved video information entry is earlier than the start time of the overlapping interval in the playlist and if this check returns a negative result, i.e. no earlier start time in the retrieved video information entry. Hence, now that it is certain that the overlapping interval from the playlist is overlapping at least the start portion of the retrieved video information entry, original or adjusted, the overlapping interval is removed from the retrieved video information entry, step 620.

After the retrieved video information entry has been adjusted the resulting video information entry is checked in order to decide whether there is any interval left in the entry, step 622. If there still is an interval left in the retrieved video information entry the process returns to step 608 for processing of the adjusted version of the retrieved video information entry. Else, if there is no interval left, then this retrieved video information entry is not to be processed anymore and the process proceeds to step 624 in order to check if there are any further video information entries to process in the video information message. If there are further video information entries to process the process returns to step 604, but if there are not further video information entries to process the process ends with a generated playlist, step 626.

Figure 8A:
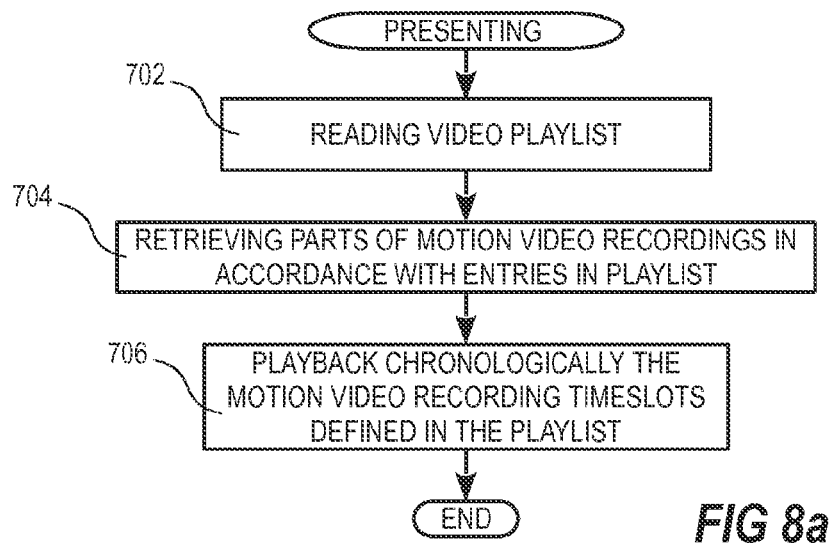
FIG. 8a shows a flowchart of a process at a client for presenting motion video based on a playlist according to one embodiment of the invention.

When a playlist has been created based on the operators initial selection, the motion video from the requested motion video source is played back using the playlist. The playlist is processed by the client. The flowchart of FIG. 8a shows one embodiment of the processing of the playlist to display the most suitable motion video recording for each and every timeslot of the requested time period. In this embodiment the client read the playlist, step 702, and download the part of each motion video recording that is defined by the playlist entries, step 704. These media addresses may address motion video recordings being stored in a camera 10, in a NAS 14, or in a video managing server 28. In cases when a motion video recording is stored on a camera or a NAS behind a firewall, from the viewpoint of the client, then the media address is an address that is resolved via the video managing server 28.

Then the video playback of each of the video files are performed chronologically, as indicated by the start time and end time connected to each video recording entry in the playlist, step 706.

Figure 8B:
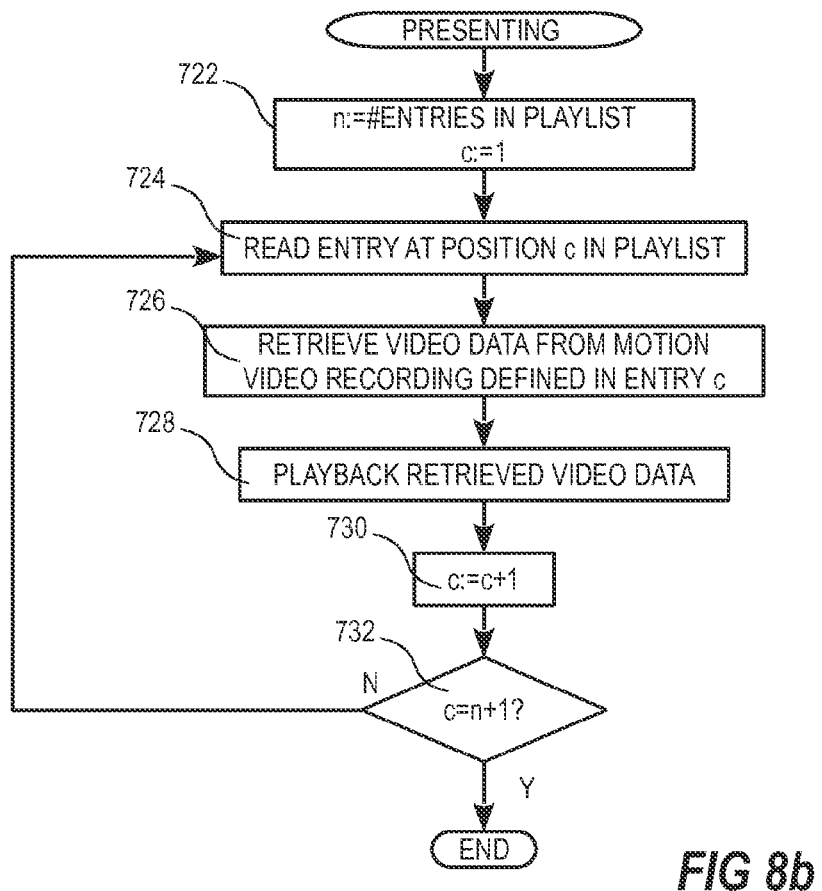
FIG. 8b shows a flowchart of a process at a client for presenting motion video based on a playlist according to another embodiment of the invention.

Another embodiment for processing the playlist at the client is showed in the flowchart of FIG. 8b. According to this process a counter c is reset in step 722, and the number of entries in the playlist is retrieved n. Then entry number c is read from the playlist, step 724, and the video data defined by the media address, start time, and end time is retrieved, step 726. The retrieved video data is then played back at the client, step 728, and the counter c is incremented by one, step 730. The steps 724-730 is repeated until all video data defined by the entries has been retrieved, in the flowchart this is symbolised by checking if the counter has passed the number of entries in the playlist, step 732. The return to step 724 may be implemented to occur before the presently played motion video recording has reached the end in order to have the next motion video recording ready for playback before the present motion video playback has ended.

Now focusing on the video managing server 28 that is arranged to process the request from the client 16 by looking up all available motion video recordings from the specified video source and then return a video information message to the client 16 for the client to process as discussed above. When the client 16 has processed the information, the client 16 may request motion video recordings from the video managing server 28.

Figure 9:
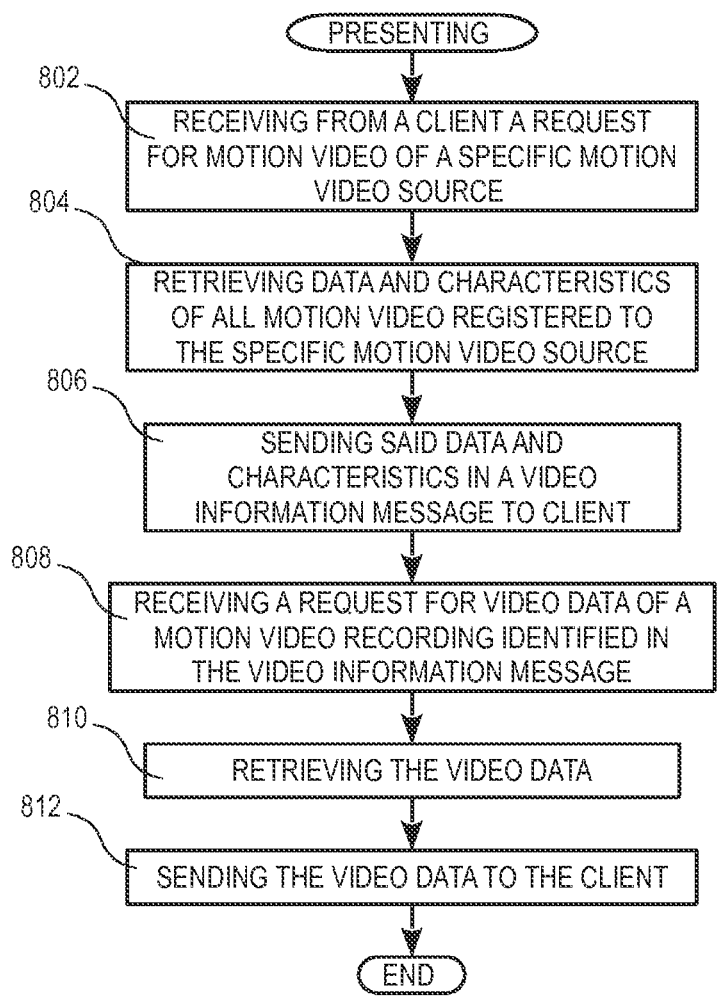
FIG. 9 shows a flowchart of a process at a video managing server for preparing presentation of motion video.

According to one embodiment the process of the video managing server 28 includes the steps of FIG. 9. The process starts when the video managing server 28 receives from the client 16 a request for motion video of a specific video source and for a specific time period, step 802. In response to the request the video managing server 28 retrieves data and characteristics relating to the specified motion video source for the specified time period, step 804. The data and characteristics retrieved may be identifiers identifying each specific recording found by the video managing server 28, a start time and an end time for each recording, at least one video quality value for each recording, and a media address that makes it possible for the client to access each recording. The video quality value may for example be video resolution, aspect ratio, frame rate, etc. The characteristics of a video recording may include any number of different types of video quality values for each recording. The media address may be in the form of a Uniform Resource Locator (URL). The data and characteristics relating to the specific video source may be stored in the video managing server 28, in a camera 10, in a NAS 14, 32, or any combination of these places. For instance may the data and characteristics for one motion video recording relating to the requested source be stored in the video managing server 28 and the data and characteristics of another motion video recording may be stored in one of the cameras 10 in the system.

Then the data and characteristics are sent in a video information message to the client 16, step 806. In cases when the video information message refers to recorded motion video accessible via the video managing server 28, the video managing server 28 may receive a request for such video data, step 808. In response to such a request the video managing server 28 retrieves the requested data, step 810, and sends it to the requesting client, step 812.

Figure 10:
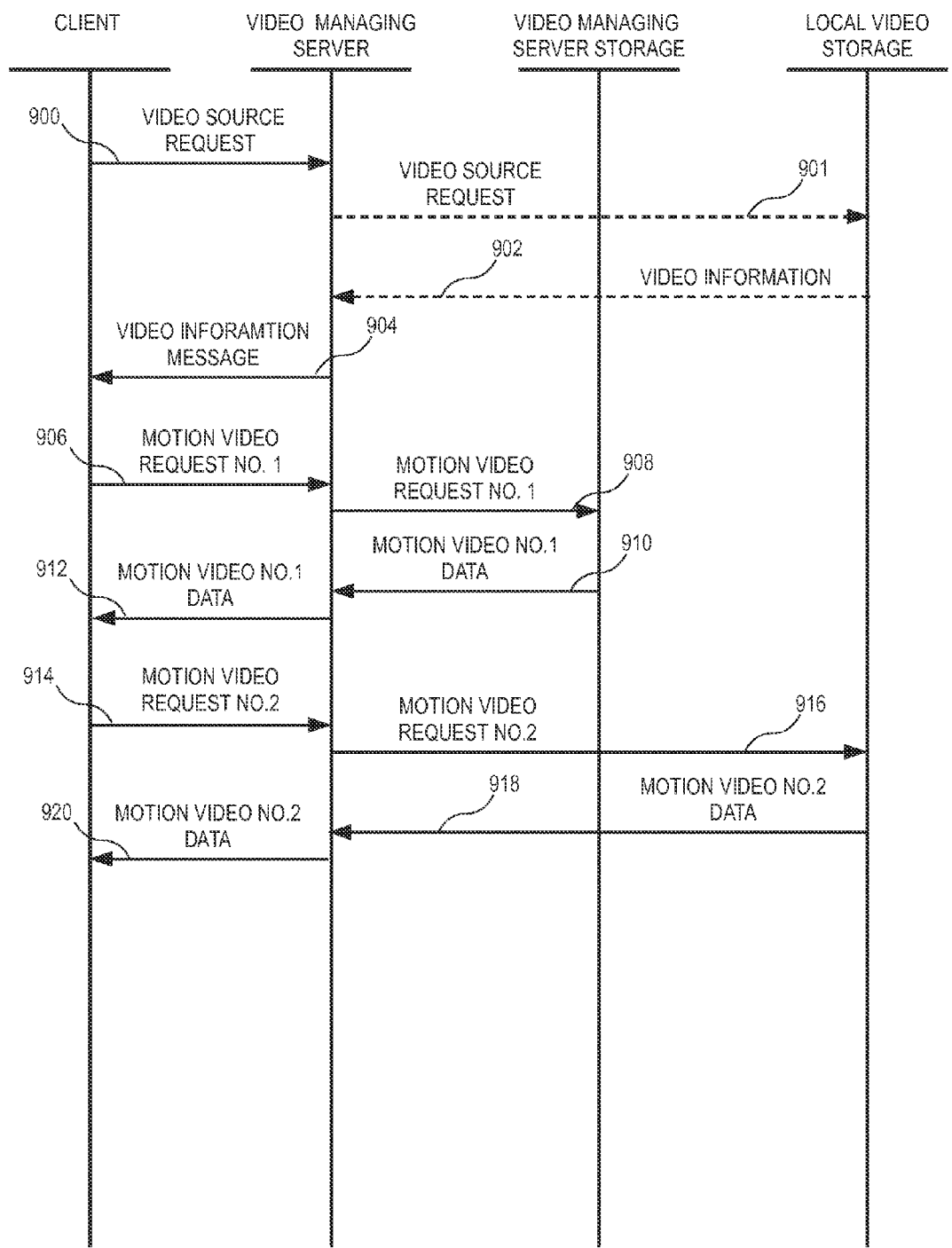
FIG. 10 shows a timing diagram of communication between client, video managing server, and various storage devices according to one embodiment of the invention.

Now referring to FIG. 10, a diagram depicting possible communication over the network in a system implementing an embodiment of the invention is showed. The initial communication is from the client 16 to the video managing server 28 and includes the request, 900, for information relating to motion video recordings within a specific time frame made by a specified source. Then the video managing server 28 may retrieve video information relating to the relevant video source and time frame from a storage device 30 of the video managing server 28. The video management server 28 returns a video information message, 904, as discussed above. However, alternatively the video managing server 28 may in addition to retrieving the video information from its own storage device send a video source request or a video information request, 901, to the source, i.e. a camera 10, 12, and/or a NAS 14, 32, registered as storing data relating to the camera 10, 12. This video information request, 901, may alternatively be implemented as a broadcast message. Then in response to the video information request, 901, video information, 902, is returned to the video managing server 28 and the video managing server 28 sends the video information message, 904, to the client.

Then the client 16 processes the information in the video information message and sends out requests for motion video in accordance with a generated playlist. The motion video requests may be sent essentially simultaneously or they may be sent, as shown in the diagram, after motion video data relating to one request has been received. Anyway, in the diagram the client 16 start by sending a first motion video request 906 for a motion video recording stored on a storage device connected to the video managing server 28. The first motion video request is then processed by the video managing server 28 that requests 908 the motion video recording from the video managing server storage 30. The Video managing server storage 30 returns 910 the requested motion video recording to the video managing server 28, which then sends 912 the motion video recording to the client 16. The second motion video is to be retrieved from a local video storage 14 (NAS) behind a firewall. Therefore the request 914 for the second motion video recording is sent from the client 16 to the video managing server 28 and then the request 916 is sent from the video managing server 28 via its firewall passing technology to the NAS 14. The NAS 14 returns 918 the requested motion video recording to the video managing server 28, which then sends 920 it along to the client 16.

Figure 11:
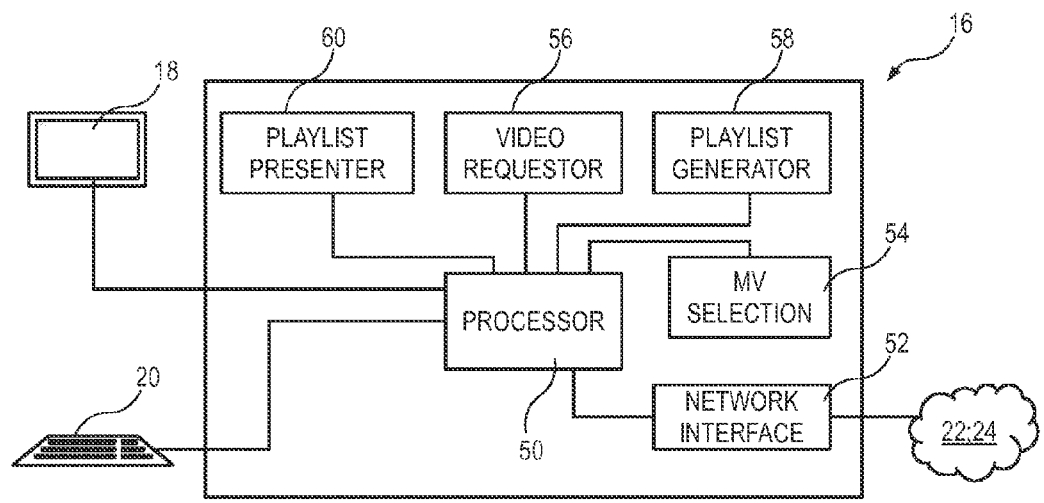
FIG. 11 shows block diagram of a client according to one embodiment of the invention.

In FIG. 11 a client 16 according to one embodiment of the invention is shown. The client may be a general purpose computer having an input device 20, e.g. a keyboard, a mouse, a joystick, etc., and a display 18. The operation and design of a general purpose computer is well known to the skilled person and the processing in the general purpose computer is performed by one central processor unit or by a plurality of processing units, the present invention is not limited to any one of these two implementations, but in order to facilitate the understanding of the application the processing capability will be referred to as the processor 50. Moreover the client is connected to a network 22, 24 as discussed above and is therefore including a network interface 52. In order to implement an embodiment of the invention the general purpose computer may include, in addition to the devices and functions of a general computer, a motion video selection module 54, a video requestor 56, a playlist generator 58, and a playlist presenter 60.

The video selection module 54 is arranged to receive inputs from the input device 20 and identify a motion video source and a time point, alternatively a time frame, and send a request to a video managing server 28 including the identifier of a motion video source and a requested time frame. The playlist generator 58 is arranged to receive the video information message from the video managing server and to select video recordings for different time slots in the time frame requested, also see steps 406-410 in connection with FIG. 4.

The video requestor 56 is arranged to request and retrieve motion video recordings or part of motion video recordings in accordance with the playlist for the playlist presenter 60 to use and play back to an operator on the display 18.

Figure 12:
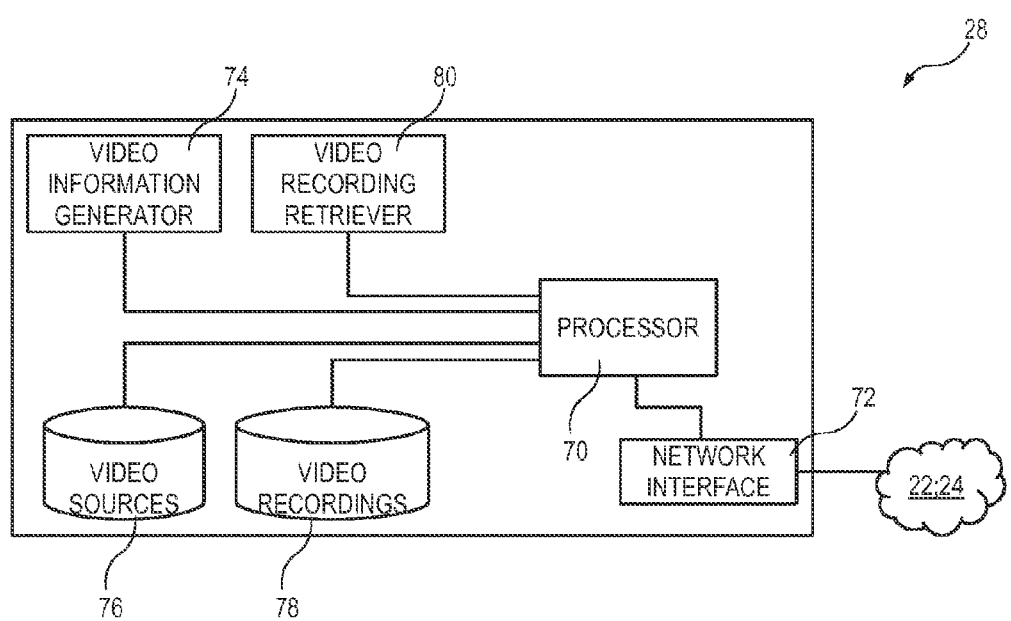
FIG. 12 shows block diagram of a video managing server according to one embodiment of the invention.

In FIG. 12 a video managing server implementing an embodiment of the invention is showed. In addition to the functionality and devices for generally managing video, e.g. processing means 70, network interfaces 72, etc. and communicating through firewalls, as has been described above, the video managing server includes a video information generator 74, a video source database 76, a video recordings data base 78, a video recording retriever 80.

The video information generator 74 is arranged to process the video source request from a client and identify the video source in the video source data base 76. Then the video information generator 74 may receive from the video source data base addresses to storage devices including information relating to recorded motion videos of the specific video source or the video source data base link the video information generator to records in the internal data base 78 of video recordings. Video information generator 74 may have to utilize both these methods in order to identify all recordings relating to the video source in the specific time frame. The video recordings may not be stored in the video recordings data base 78. According to one embodiment the video recordings data base 78 only includes information of recorded motion videos relating to media addresses, start times, end times, video characteristics, etc. The video recording retriever 80 is arranged to enable access to video recordings stored behind firewalls. The video recording retriever receives an address or other identifier of a specific motion video recording, retrieves the motion video recording, and sends the motion video recording to the client 16.

What is claimed is:

1. A method for preparing presentation of recorded motion video, wherein said method comprises:
   preparing and sending a request for recorded video that originates from a specific video source, wherein the video source is a camera that captured the recorded video;
   receiving a video information message including data relating to characteristics of a plurality of motion video recordings captured by the video source, wherein the received characteristics of each motion video recording includes a recording identity, a video quality value, a media address, an indication of start time and end time for the recording; and
   generating a motion video play scheme by selecting and registering the recording in the motion video play scheme based at least on said video quality value, said indication of start time, and said indication of end time for each motion video recording, wherein the generation of the motion video play scheme includes selecting one motion video recording to represent a specific time period for which time period a plurality of motion video recordings have been identified and wherein the selecting includes selecting the motion video recording having a video selection value that is closest to a predetermined video selection value, said video selection value being based on one or a plurality of video quality values.

2. The method according to claim 1, wherein said video quality value includes a video resolution value and said generating of the motion video play scheme is additionally based on an intended video resolution for the presentation at an intended presentation device.

3. The method according to claim 1, wherein said video quality value includes a video resolution value and wherein the generation of a motion video play scheme includes selecting one motion video recording to represent a specific time period for which time period a plurality of motion video recordings have been identified, the selecting includes selecting the motion video recording in the specific time period having a video resolution value that is lower than the motion video recording having the highest video resolution value.

4. The method according to claim 1, wherein said video quality value includes a video resolution value and wherein the generation of a motion video play scheme includes selecting one motion video recording to represent a specific time period for which time period a plurality of motion video recordings have been identified, the selecting includes calculating a video selection value for each motion video recording representing the time period and then select the motion video recording having a video selection value closest to a predetermined target video selection value, the video selection value for each motion video recording in the specific time period is calculated from a relation between an intended video resolution and the video resolution of the motion video recording.

5. The method according to claim 4, wherein said video quality value further includes a video aspect ratio and wherein the video selection value for each motion video recording is further calculated from an intended video aspect ratio and the video aspect ratio of the motion video recording.

6. The method according to claim 1, wherein said request for video from a specific video source is sent to a video managing server.

7. The method according to claim 1, wherein said request for video from a specific video source is sent via a computer network and wherein said video information message is received via a computer network.

8. The method according to claim 1, wherein said video quality value includes a video frame rate value and wherein the generation of a motion video play scheme includes selecting one motion video recording to represent a specific time period for which time period a plurality of motion video recordings have been identified, the selecting includes selecting the motion video recording in the specific time period having a video frame rate value that is lower than the motion video recording having the highest video frame rate value.

9. The method according to claim 1, wherein the generated motion video play scheme includes a plurality of recording identities, media addresses related to the recording identities and start times related to the recording identities, wherein the start times indicates a temporal position in a related motion video recording.

10. The method according to claim 1, further comprising:
   retrieving, for each start time in the generated motion video play scheme, a related recording identity and a related media address;
   requesting, from the retrieved media addresses, motion video recordings having the retrieved recording identities related to each media address, and
   presenting the requested motion video recordings in an order defined by the motion video play scheme.

* * * * *